May 26, 1970  TOSHIMASA FUJIWARA ET AL  3,514,648
OUTER ROTOR TYPE MOTOR
Filed Sept. 11, 1967  3 Sheets-Sheet 3
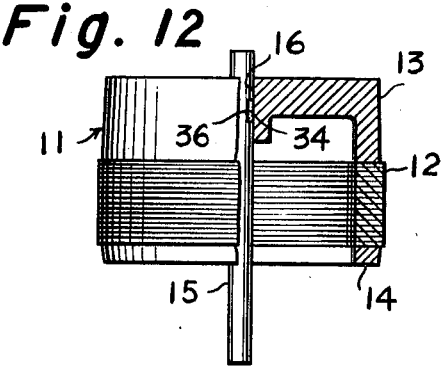
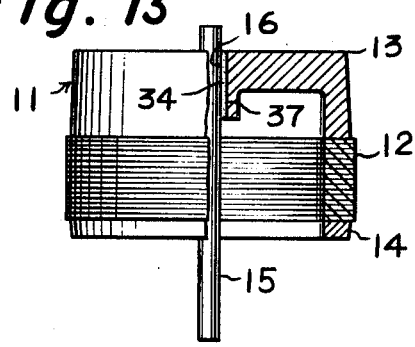
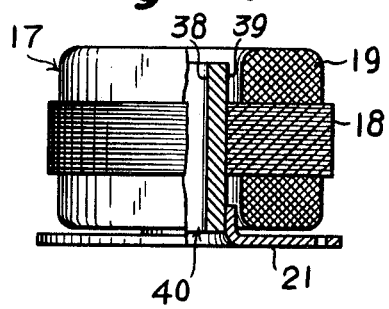
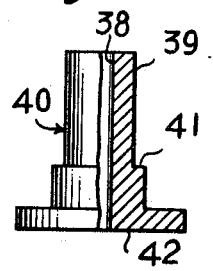
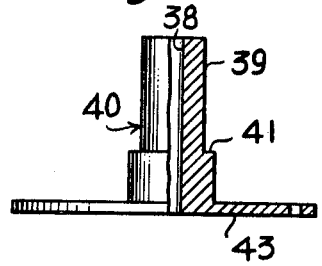
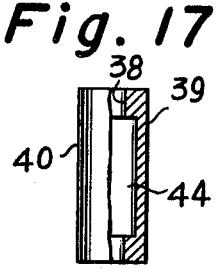
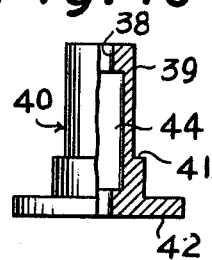
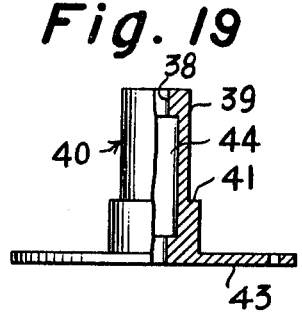
INVENTORS
TOSHIMASA FUJIWARA, TAKAO MIYASAKA,
SEIICHI WATANABE, HIDEKAZU SHIMIZU,
BY Stevens, Davis, Miller & Mosher
ATTORNEYS United States Patent Office 3,514,648
Patented May 26, 1970

3,514,648
OUTER ROTOR TYPE MOTOR
Toshimasa Fujiwara and Takao Miyasaka, Yokohama, Seiichi Watanabe, Zushi, and Hidekazu Shimizu, Yokohama, Japan, assignors to Victor Company of Japan, Limited, Yokohama, Japan
Filed Sept. 11, 1967, Ser. No. 666,814
Claims priority, application Japan, Sept. 12, 1966, 41/85,496
Int. Cl. H02k 7/00
U.S. Cl. 310—67                                    8 Claims

ABSTRACT OF THE DISCLOSURE

An outer rotor type motor incorporating the following improvements: an end plate and an end ring of a rotor of this motor are formed to provide on their undersides holes drilled therein or chips inserted in a number of small perforations formed beforehand to effect dynamic balancing adjustments of the rotor; the rotor of this motor has on its outer circumferential surface a portion which is not tapered to facilitate removal of the rotor from a die in forming the rotor by die casting, so that the rotor can readily be gripped by chuck means and subjected to high precision machining operations; a rotor shaft of this motor or a bore in which is received said rotor shaft is formed with an adhesive reservoir for firmly securing the rotor shaft in the bore; and bearing means of this motor to replace tubular spindle and bearing members of the prior art is formed integrally of an oilless bearing alloy.

---

This invention relates in general to outer rotor type motors having a rotor disposed around a stator, and in particular to an outer rotor type motor provided with a rotor, a rotor shaft, and bearing means of improved construction.

Dynamic balancing adjustments of a rotor of a motor is generally effected by cutting the opposite ends of the rotor. Satisfactory results can be achieved by this process in the case of a conventional motor in which a stator is disposed outside and a rotor is disposed inside, but the process of dynamic balancing adjustments referred to above has had the disadvantage of poor operational efficiency and markedly spoiled external appearance in the case of an outer rotor type motor in which a rotor is disposed outside and a stator is disposed inside.

In the case of a small outer rotor type motor such as the one used for a phonomotor, for example, the deviation of the inner diameter of a rotor should be within about $\frac{1}{100}$ millimeter with a rotor shaft being disposed in the center. This has made it necessary to subject the inner portion of the rotor and a bore for receiving a rotor shaft therein to machining operations in a single chucking. It has been usual practice to grip a laminated iron core by means of a chuck. A disadvantage of this process has been that chucking sometimes results in slight deformation in the rotor depending on the radial thickness of the laminated iron core, with the rotor which should otherwise be circular in shape becoming polygonal (triangular when a chuck with three pawls is used) after the chuck is removed.

In securing a rotor shaft of an outer rotor type motor to a bore in the rotor for receiving the rotor shaft, usual practice has been to insert the rotor shaft in the bore by slide fitting or loose fitting and then to apply paste to the interface between the rotor shaft and the bore. This process has, however, been unable to achieve satisfactory results in imparting sufficient strength to the rotor shaft.

The bearing means for supporting the rotor shaft secured to the outer rotor has hitherto been formed by mounting a tubular spindle in the center of the stator iron core by force fitting and then inserting two bearing members in the interior of the spindle by force fitting. A disadvantage of this type of bearing means has been that in cases where the bearing members do not agree with each other in the concentricity of inner and outer diameters, the rotation of the rotor has markedly been interfered with. Furthermore, the eccentricity of the inner diameter of the bearing members with the outer diameter of the stator has resulted in the accumulation of errors of the stator iron core, tubular spindle and bearing members, so that it has been difficult to increase accuracy of the product.

The present invention obviates all the disadvantages referred to above. According to the invention, there is provided an outer rotor type motor of improved construction in which a rotor is formed with holes drilled or chips inserted in small perforations formed beforehand for effecting dynamic balancing adjustments of the rotor on one end thereof, the rotor is formed to provide on its outer circumferential surface a portion which is not tapered to facilitate removal of the rotor from a die in forming the rotor by die casting, an adhesive reservoir is provided in a rotor shaft or a bore for receiving the rotor shaft therein, and bearing means to replace a tubular spindle and bearing members of the prior art is formed integrally of an oilless bearing alloy.

The principal object of the present invention is to provide an outer rotor type motor of improved construction which is free from irregularities in rotation, high in efficiency, easy to manufacture, and adapted for mass production.

Another object of the invention is to provide an outer rotor type motor of improved construction which permits to readily effect dynamic balancing adjustments only from one side of a rotor so as not to spoil its external appearance.

Another object of the invention is to provide an outer rotor type motor of improved construction which permits to simultaneously effect the grinding of a rotor and the drilling of a bore for receiving a rotor shaft therein with high precision.

Another object of the invention is to provide an outer rotor type motor of improved construction which permits to firmly secure a rotor shaft to a rotor.

Still another object of the invention is to provide an outer rotor type motor of improved construction which is provided with bearing means for supporting a rotor which is high in accuracy and long in service life.

Other objects and features of the invention will become apparent from consideration of the following description in conjunction with the accompanying drawings, in which:

FIG. 12 is a fragmentary longitudinal sectional side view of a seventh embodiment of an outer rotor type motor in which a rotor shaft is firmly secured to a rotor according to the present invention;

FIG. 13 is a fragmentary longitudinal sectional side view of an eighth embodiment of an outer rotor type motor in which a rotor shaft is firmly secured to a rotor according to the present invention;

FIG. 14 is a fragmentary longitudinal sectional side view of a ninth embodiment of an outer rotor type motor provided with bearing means according to the present invention;

FIG. 15 is a fragmentary longitudinal sectional side view of a tenth embodiment of an outer rotor type motor provided with bearing means according to the present invention;

FIG. 16 is a fragmentary longitudinal sectional side view of an eleventh embodiment of an outer rotor type motor provided with bearing means according to the present invention;

FIG. 17 is a fragmentary longitudinal sectional side view of a twelfth embodiment of an outer rotor type motor provided with bearing means according to the present invention;

FIG. 18 is a fragmentary longitudinal sectional side view of a thirteenth embodiment of an outer rotor type motor provided with bearing means according to the present invention; and FIG. 19 is a fragmentary longitudinal sectional side view of a fourteenth embodiment of an outer rotor type motor provided with bearing means according to the present invention.

In the description set forth hereunder for explaining various embodiments of the invention, like reference characters designate similar parts.

Figure 1:
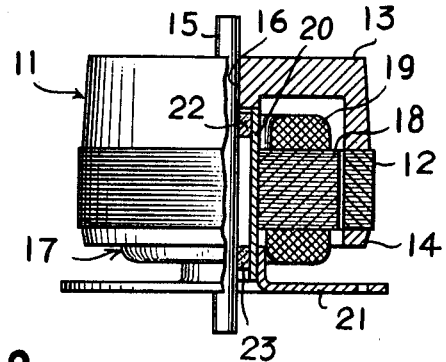
FIG. 1 is a fragmentary longitudinal sectional side view of one form of an outer rotor type motor of the prior art.

In FIG. 1, 11 generally designates a rotor of the prior art comprising a hollow laminated iron core 12 formed of a magnetic material such as silicon steel plates, for example, an end plate 13 and an end ring 14 serving concurrently as a short-circuit ring of the rotor and formed integrally of a conducting material such as aluminum, for example, by die casting, and a conducting member (not shown) inserted in a bore formed in said laminated iron core, said rotor 11 being formed as a cage-shaped rotor. A rotor shaft 15 is inserted and secured in place in a bore 16 formed in the center of said end plate 13 of the rotor for receiving the rotor shaft therein. A stator 17 is mounted inside of said rotor and consists of a hollow laminated iron core 18 and coils 19 wound on said iron core. A tubular spindle 20 is fitted in an opening in the center of said laminated iron core 18 of said stator, and a motor holder 21 is mounted by force fitting on the lower portion of said spindle. Two bearing members 22 and 23 are mounted in the inside of said spindle by press fitting for supporting said rotor shaft 15 of said rotor.

Figure 2:
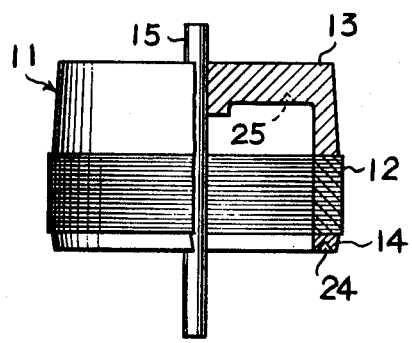
FIG. 2 is a fragmentary longitudinal sectional side view of a first embodiment of an outer rotor type motor for effecting dynamic balancing adjustments according to the present invention.
Figure 4:
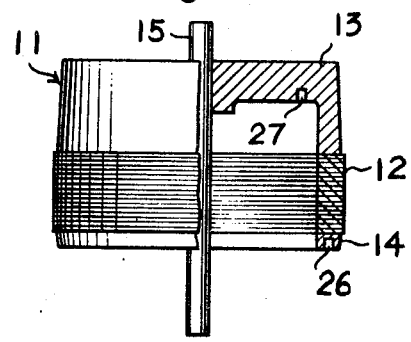
FIG. 4 is a fragmentary longitudinal sectional side view of a second embodiment of an outer rotor type motor for effecting dynamic balancing adjustments according to the present invention.
Figure 3:
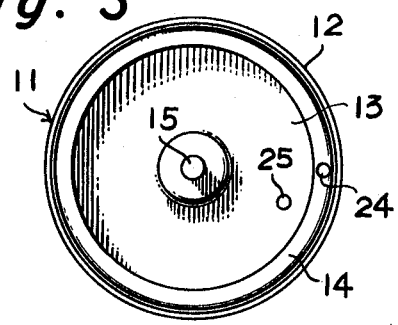
FIG. 3 is a bottom plan view, as seen from below, of a rotor, of the motor shown in FIG. 2.
Figure 5:
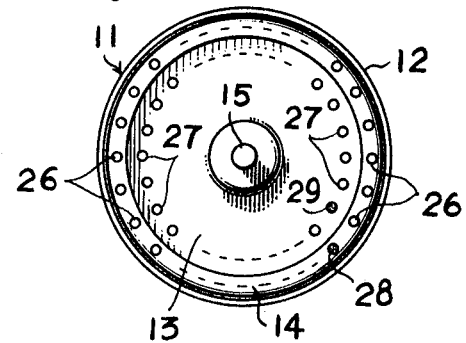
FIG. 5 is a bottom plan view, as seen from below, of a rotor of the motor shown in FIG. 4.

The manner in which dynamic balancing adjustments are effected according to the present invention will now be explained. In FIGS. 2 and 3, there are shown balancing adjustment holes 24 and 25 formed properly on the bottom of the end plate 13 and end ring 14 which are visible on the bottom of the rotor 11. In drilling holes for effecting dynamic balancing adjustments of the rotor, a rotor having no holes thereon is subjected to balancing tests by means of a balancing machine to find out unbalanced portions of the rotor. Then, holes of a proper size and number, such as the holes 24 and 25, are formed as by a drilling machine in proper positions depending on the results of tests. Alternatively, the end plate 13 and end ring 14 can be formed beforehand with a number of holes such as small holes 26 and 27, 2 millimeters in diameter, for example, on their bottom surfaces visible on the bottom of the rotor 11, said small holes 26 and 27 being arranged at regular intervals to form circles, instead of forming holes each time unbalanced portions are found as the results of tests. The rotor having a number of small holes formed beforehand is then subjected to balancing tests, and upon detection of unbalanced portions balancing adjustment chips 28 and 29 formed of a material of a relatively high specific gravity such as lead, for example, and having a proper weight and a size sufficiently large to be inserted in said small holes by force fitting. In the figure, the small holes 26 and 27 are arranged symmetrically on the bottom of the rotor, with the same number of holes being arranged to form several circles, but it should be noted that the small holes 26 and 27 need not be arranged in an orderly manner and that their numbers may vary as required.

Figure 7:
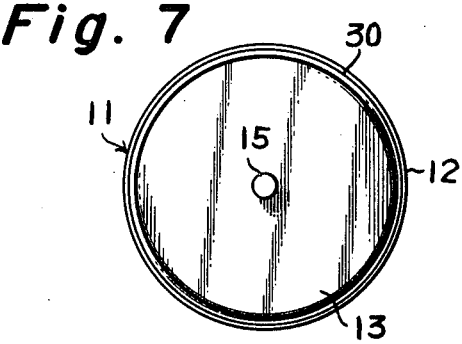
FIG. 7 is a plan view as seen from above of a rotor of the motor shown in FIG. 6.
Figure 6:
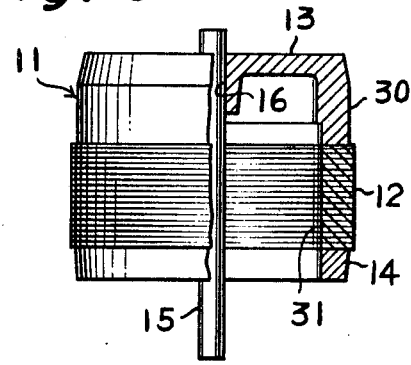
FIG. 6 is a fragmentary longitudinal sectional side view of a third embodiment of an outer rotor type motor having a portion on the outer circumferential surface of the rotor thereof which is not tapered to facilitate removal of the rotor from a die according to the present invention.

The manner in which the rotor is subjected to high precision machining operations according to the present invention will now be explained, FIGS. 6 and 7 illustrate a rotor 11 having an end plate 13 formed with a portion 30 not tapered to facilitate removal of the rotor from a die which extends along the entire length of the circumferential surface thereof, said portion 30 being of a length which is sufficiently great to permit a chuck to grip the rotor and which is sufficiently small to permit the rotor to be removed from a die without difficulty in die casting. In drilling the bore 16 for fitting the rotor shaft and grinding an inner portion 31 of the laminated iron core prior to mounting the rotor shaft 15, the portion 30 on the outer circumferential surface of the end plate 13 is chucked for subjecting the rotor to machining operations. By this process, machining operations can be performed in a single chucking on the rotor shaft bore 16 and the inner portion 31 of the laminated iron core 12 while maintaining them in concentric relationship without deforming the laminated iron core.

Figure 9:
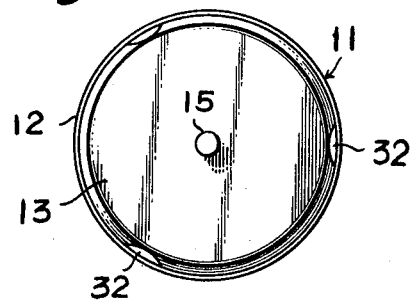
FIG. 9 is a plan view, as seen from above, of a rotor of the motor shown in FIG. 8.
Figure 8:
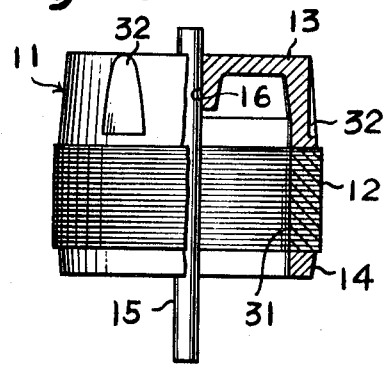
FIG. 8 is a fragmentary longitudinal sectional side view of a fourth embodiment of an outer rotor type motor having a portion on the outer circumferential surface of the rotor thereof which is not tapered to facilitate removal of the rotor from a die according to the present invention.

FIGS. 8 and 9 illustrate a rotor having an end plate 13 formed with recesses 32 on that portion of the circumferential surface thereof which is not tapered, said recesses 32 being equal in number to pawls of a chuck of a grinder and disposed in positions corresponding to the positions of said pawls. If the pawls of chuck are applied to said recesses for carrying out machining operations, it will be possible to grip the rotor with a relatively small force, so that high precision machining operations can be performed in the same way as referred to above. It is to be noted that since the portion of the outer circumferential surface which is not tapered is only a small area, there is no danger of difficulty experienced in removing the rotor from a die in forming the rotor by die casting. This embodiment is illustrated as having recesses, but alternatively, bulges may be formed with the same effect at that portion of the outer circumferential surface which is not tapered.

Figure 10:
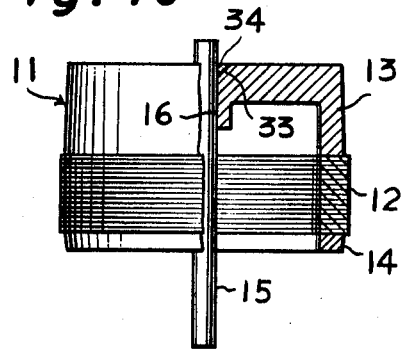
FIG. 10 is a fragmentary longitudinal sectional side view of a fifth embodiment of an outer rotor type motor in which a rotor shaft is firmly secured to a rotor according to the present invention.

The manner in which a rotor shaft is firmly secured to a rotor will now be explained. The rotor shaft 15 is generally fitted by force fitting into the rotor shaft fitting bore 16 formed in the end plate 12 of the rotor 11, and secured in place by applying paste. It has hitherto been impossible to impart sufficient strength to the rotor shaft by the conventional process because of the fact that the rotor 11 is formed of aluminum of a purity of 99.9%. According to the present invention, there is provided an adhesive reservoir either in the rotor shaft or the rotor shaft fitting bore in positions where the rotor shaft and the rotor fitting bore are in contact with each other. In FIG. 10, the rotor shaft fitting bore 16 is formed to provide at the upper and thereof a spot facing 33 which can serve as an adhesive reservoir. The spot facing 33 is filled with a quantity of an adhesive 34 so as to firmly secure the rotor shaft 15 in place in the rotor shaft fitting bore.

Figure 11:
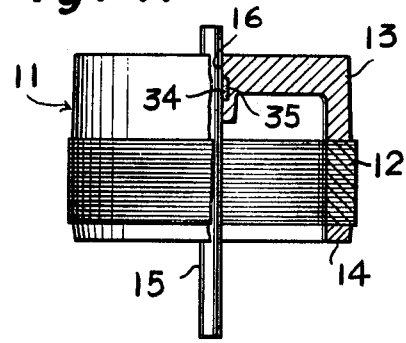
FIG. 11 is a fragmentary longitudinal sectional side view of a sixth embodiment of an outer rotor type motor in which a rotor shaft is firmly secured to a rotor according to the present invention.

In the embodiment shown in FIG. 11, the rotor 11 is formed, in forming same by die casting, to provide on the inner wall of the rotor shaft fitting bore a groove 35, disposed along the entire circumference thereof or in a plurality of positions, which can serve as an adhesive reservoir for receiving a quantity of an adhesive 34 therein.

FIG. 12 shows an embodiment in which the rotor shaft 15 is formed to provide a groove 36, disposed along the entire circumference thereof or in a plurality of positions maintaining contact with the rotor shaft fitting bore 16, which can serve as an adhesive reservoir for receiving a quantity of an adhesive 34 therein.

In FIG. 13 is shown an embodiment in which a plurality of axially oriented grooves 37 which can serve as an adhesive reservoir are formed on the inner wall of the rotor shaft fitting bore 16 of the rotor 11, said grooves 47 being formed either when the rotor is formed by die casting or later.

The bearing means according to the present invention will now be explained.

The bearing means shown in FIG. 14 consists of an axially elongated bearing 40 formed of an oilless bearing alloy by sintering and having an inner diameter equal to the diameter of a bearing bore 38 in which is journalled the rotor shaft 15 and an outer diameter sufficiently great to permit the bearing means to be force fitted and secured in the center portion of the laminated iron core 18 of the stator. It is to be noted that the bearing means according to this invention is formed integrally in contrast to the prior art bearing means which consists of a tubular spindle 20 and two bearing members 22 and 23 formed as separate units. This arrangement is conducive to reduced error as aforementioned, with the inner diameter and outer diameter being positively maintained concentric with each other so as not to interfere with the rotation of the rotor. Having an elongated bearing bore, the bearing means according to this invention contains a larger quantity of lubricating oil with attendant longer service life. Being formed integrally, the bearing means of this invention requires a smaller number of operational steps involved in fabricating same than a conventional bearing.

The bearing 40 shown in FIG. 15 is formed with an offset portion 41 formed on the outer circumferential surface 39 thereof which is used for positioning the stator iron core 18 force fitted and secured in the bearing means. The provision of said offset portion 41 permits the stator iron core 18 to be mounted at a predetermnied position in the bearing means. A motor holder mounting portion 42 is provided at the lower end of the bearing.

The bearing means shown in FIG. 16 is formed integrally with a motor holder portion 43, instead of the motor holder mounting portion. The provision of a motor holder portion formed integrally with bearing means can eliminate errors occurring in the axial and vertical directions relative to the axis of the bearing bore in mounting the bearing means of prior are formed independently of a motor holder to be force fitted and mounted.

The embodiments shown in FIGS. 17 to 19 are formed with a lubricant reservoir 44 disposed in the bearing bore 38 of the bearing 40 shown in FIGS. 14 to 16. With a large quantity of lubricant filling said lubricant reservoir 44, the motor never runs out of oil and its service life can be lengthened.

Although the present invention has been shown and described with reference to various embodiments of an outer rotor type motor, it is to be understood that the invention is not limited thereto, and that changes and modifications may be made therein without departing from the spirit and scope of the invention which is defined in the appended claims.

What we claim is:

1. An outer rotor type motor comprising a stator provided with a stator iron core; and a rotor adapted to rotate outside of said stator; said rotor including a rotor shaft and an integral casting member of a rotor iron core, an end ring of conductive material, and an end plate of conductive material formed with a bore for receiving said rotor shaft therein; said end ring having a free end surface in which is formed a hole means for adjusting dynamic balance; said end plate including a surface facing in the same direction as said free end surface and also including a hole means therein for adjusting dynamic balance.

2. An outer rotor type motor comprising a stator provided with a stator iron core; and a rotor adapted to rotate outside of said stator; said rotor including a rotor shaft and an integral casting member of a rotor iron core, an end ring of conductive material, and an end plate of conductive material formed with a bore for receiving said rotor shaft therein; said end ring having a free end surface which includes a plurality of holes, some of which are filled with a metal chip for dynamic balance; said end plate including a surface facing the same direction as said free end surface of said end ring and also including a plurality of holes, some of which are filled with a metal chip for dynamic balance.

3. An outer rotor type motor comprising a stator provided with a stator iron core; and a rotor adapted to rotate outside of said stator; said rotor including a rotor shaft and an integral casting member of a rotor iron core, an end ring of conductive material, and an end plate of conductive material, including a bore for receiving said rotor shaft therein, said bore including an adhesive reservoir filled with an adhesive material for firmly securing the rotor shaft therein.

4. An outer rotor type motor as claimed in claim 3 in which said adhesive reservoir is a spot facing formed on the upper end surface of said rotor shaft receiving bore.

5. An outer rotor type motor as claimed in claim 3 in which said adhesive reservoir is a groove formed along the length of the inner circumferential surface of said rotor shaft receiving bore.

6. An outer rotor type motor as claimed in claim 3 in which said adhesive reservoir is a plurality of grooves formed on the inner circumferential surface of said rotor receiving bore.

7. An outer rotor type motor as claimed in claim 3 in which said adhesive reservoir is a plurality of grooves axially oriented on the inner circumferential surface of said rotor shaft receiving bore.

8. An outer rotor type motor comprising a stator provided with a stator iron core; and a rotor adapted to rotate outside of said stator; said rotor including a rotor shaft and an integral casting member of a rotor iron core, an end ring of conductive material, and an end plate of conductive material including a bore for receiving said rotor shaft therein; said rotor shaft including an adhesive reservoir filled with an adhesive material whereby the rotor shaft is firmly secured in said bore.

References Cited

UNITED STATES PATENTS

| | | | |
|---|---|---|---|
| 1,796,556 | 3/1931 | Boitel | 310—67 |
| 2,416,300 | 2/1947 | Godsey | 310—67 |
| 2,990,112 | 6/1961 | Levy | 310—67 |
| 3,290,528 | 12/1966 | Adler | 310—154 |

MILTON O. HIRSHFIELD, Primary Examiner

R. SKUDY, Assistant Examiner

U.S. Cl. X.R.

29—598